United States Patent
Lent

[11] Patent Number: 6,012,227
[45] Date of Patent: Jan. 11, 2000

[54] CONTOURED CONTAINER SCOOP AND SCRAPER

[76] Inventor: David C. Lent, 450 113th Ave. NE., Blaine, Minn. 55434

[21] Appl. No.: 09/039,000

[22] Filed: Mar. 10, 1998

Related U.S. Application Data

[60] Provisional application No. 60/040,559, Mar. 14, 1997.

[51] Int. Cl.[7] ..................................................... A47L 13/08
[52] U.S. Cl. ........................................... 30/169; 15/236.01
[58] Field of Search .................................. 30/169, 308.1; 15/236.01, 236.07, 236.05, 236.09; 83/356.3; 241/168; D7/368, 669, 688, 642; D8/11

[56] References Cited

U.S. PATENT DOCUMENTS

| | | | |
|---|---|---|---|
| 26,535 | 12/1859 | Tate | 30/171 |
| 111,952 | 2/1871 | Locke | 30/169 X |
| D. 144,376 | 4/1946 | Getgey | D35/2 |
| D. 248,819 | 8/1978 | Hare | D8/11 |
| 671,381 | 4/1901 | Jenkins | 172/371 |
| 690,839 | 1/1902 | Coyan | 30/169 X |
| 1,649,921 | 11/1927 | Paluck | 403/198 |
| 2,291,015 | 7/1942 | Anderson | 30/171 |
| 2,437,316 | 3/1948 | Gambino et al. | 15/236 |
| 2,599,193 | 6/1952 | Morris | 30/169 |
| 3,156,305 | 11/1964 | Nash | 172/381 |
| 4,355,432 | 10/1982 | Storm, Jr. | 15/245 |
| 4,850,728 | 7/1989 | Arroyo | 401/139 |
| 5,033,156 | 7/1991 | Stewart | 15/236.05 |
| 5,309,598 | 5/1994 | Carpenter | 30/169 X |
| 5,491,862 | 2/1996 | Hurley | 30/169 X |
| 5,624,145 | 4/1997 | Swilley | 294/55 |
| 5,799,997 | 9/1998 | Lehn et al. | 294/55 |

*Primary Examiner*—Rinaldi I. Rada
*Assistant Examiner*—Ana Luna
*Attorney, Agent, or Firm*—Steven P. Skabrat

[57] ABSTRACT

Tool for obtaining materials out of a cylindrical container includes an elongated handle attached to or integrally formed with a generally pie-shaped end plate. The end plate has a downwardly projecting edge for use as a scraping edge when the tool is rotated within the container. The end plate has an edge in the shape of an arc to conform to the inside radial surface of a cylindrical container during use.

2 Claims, 6 Drawing Sheets

CONTOURED CONTAINER SCOOP AND SCRAPER

CROSS-REFERENCE TO RELATED APPLICATIONS

This application claims the benefit of U.S. Provisional Application No. 60/040,559, entitled "Contoured Container Scoop and Scraper", filed Mar. 14, 1997.

BACKGROUND OF THE INVENTION

1. Field of the Invention

The invention relates generally to tools for handling of materials and more specifically to a tool for scooping and scraping materials stored within a cylindrical container.

2. Description of Related Art

The use of drywall materials for interior walls in residential and commercial buildings is widespread. Once the drywall sheets are affixed to studs, the seams between adjacent sheets are sealed with a tape and covered with a material generally called joint compound. Joint compound is typically sold in cylindrical containers such as buckets in a quantity such as five gallons. Application of the joint compound is achieved by scooping out a sizable portion and applying it on or in the worker's tools, where it is then applied to the drywall. Typically, workers use many different objects for performing the scooping operation, many of which are ill-suited to the task. Such objects include spoons, trowels, sticks, cups, scoops, and the like. These objects may be generally acceptable for simply obtaining joint compound from the bucket, but all leave substantial residue of the joint compound in the bucket which cannot be reached by the objects because of their shape. This results in waste of the joint compound. In addition, the objects used do not allow the worker to obtain most of the joint compound from the bucket without spillage. Use of these objects also results in unnecessary contact of the joint compound with the worker's hand or arm in any attempt to get at the residue. Furthermore, the action of scooping the joint compound out of the bucket is repeated many times by the worker, so a specialized tool for scooping and scraping in a clean and efficient manner would be valuable.

SUMMARY OF THE INVENTION

An embodiment of the present invention is a contoured container scoop and scraper tool for obtaining all product from a cylindrical container. The tool includes an elongated handle and a generally pie-shaped plate coupled to one end of the elongated handle and extending substantially perpendicularly thereto, the plate having a first edge projecting downwardly at an angle for use as a scraping edge.

Still other features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended Claims.

BRIEF DESCRIPTION OF THE DRAWINGS

The invention will be better understood with reference to the accompanying drawings in combination with the following description.

DETAILED DESCRIPTION OF THE INVENTION

Figure 1:
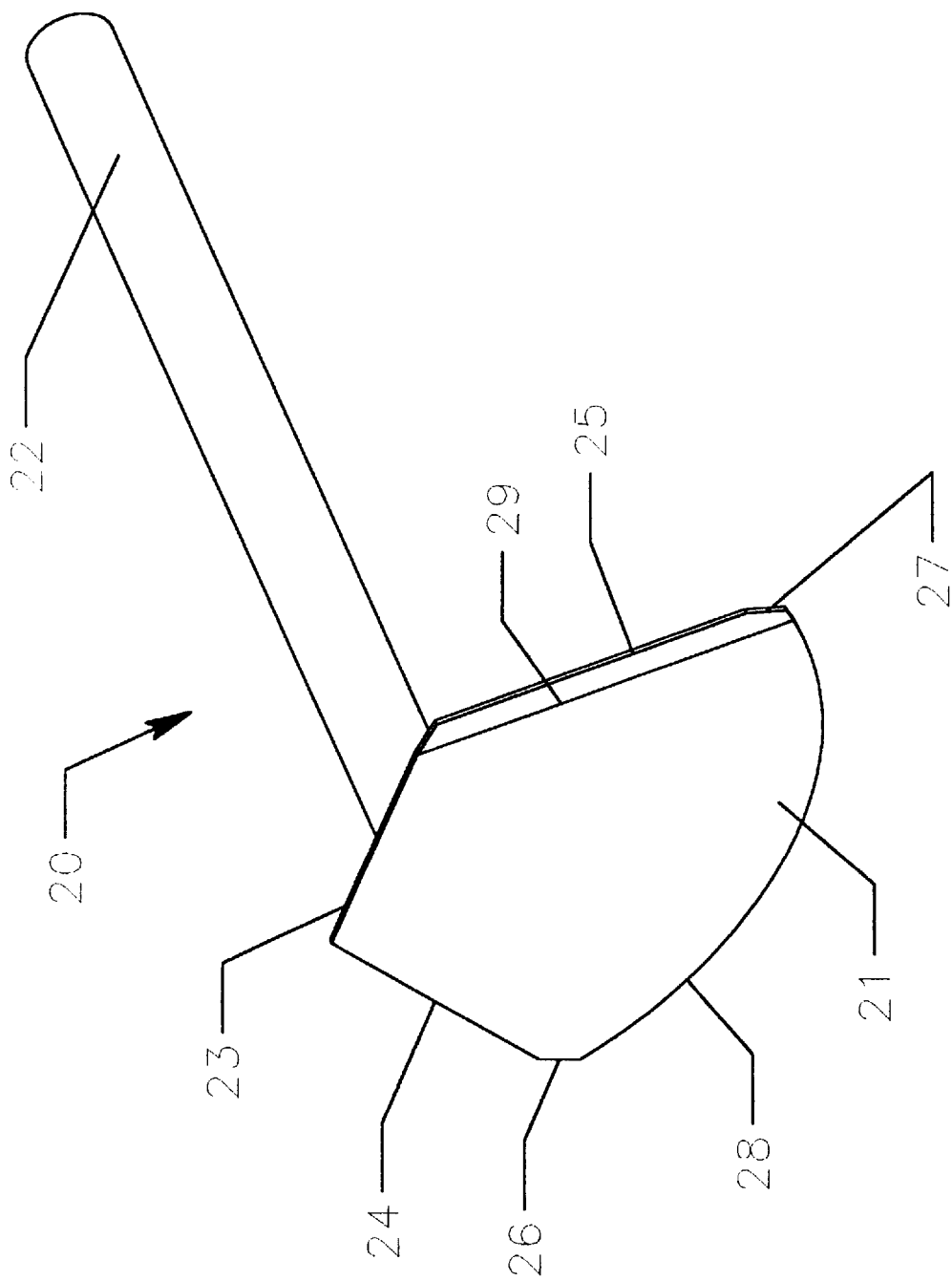
FIG. 1 is a perspective view of an embodiment of the present invention.

Reference is made first to FIG. 1, which illustrates an embodiment of the present invention. A new and improved hand tool is shown which relates to the handling of scoopable bulk products from a cylindrical container in a most efficient and clean manner. The tool is designed to fit the inside radial contour of the container to facilitate the removal of various products with very little or no product residue remaining in the form of waste.

Figure 2:
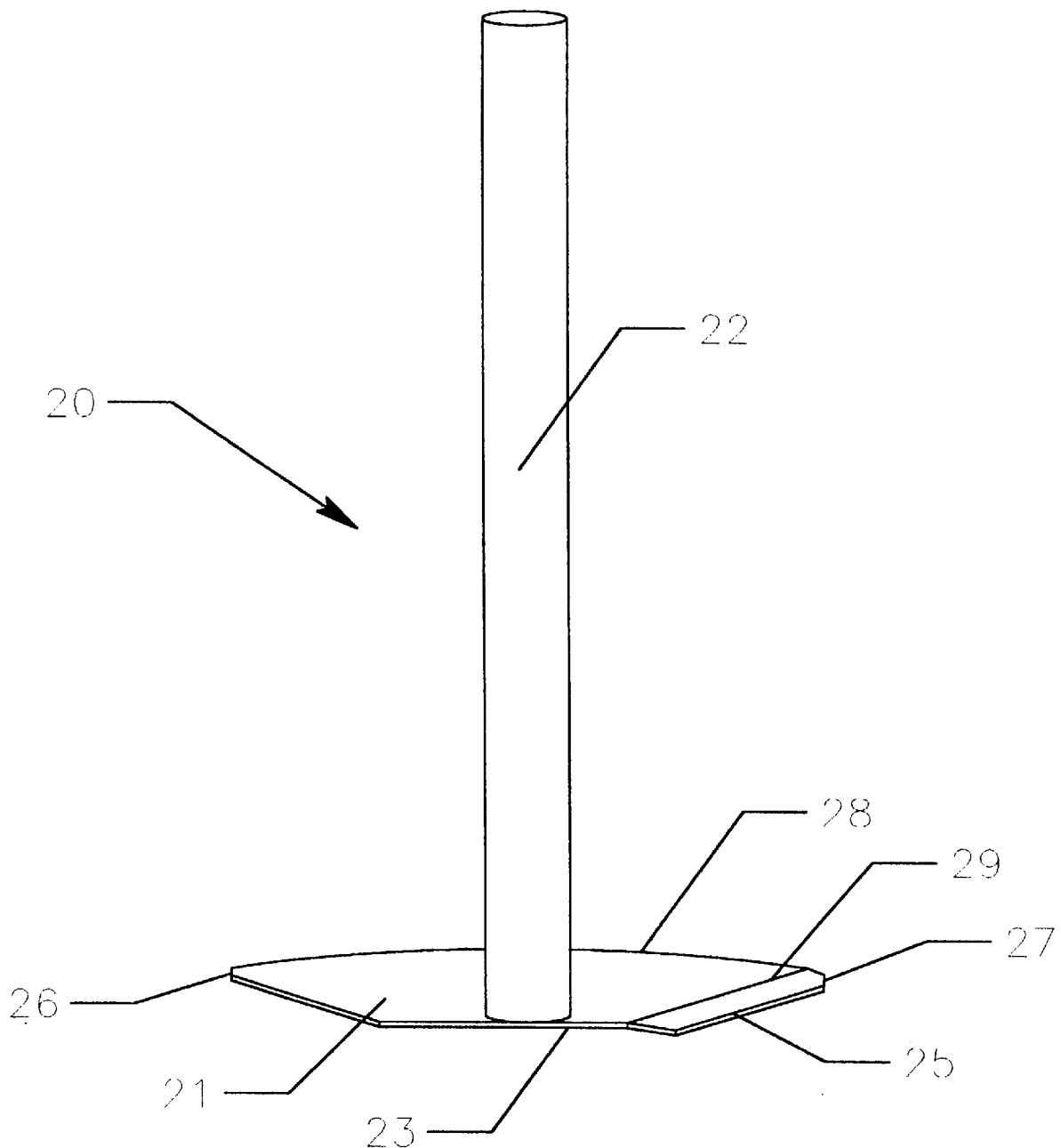
FIG. 2 is a rear view of the an embodiment of the present invention.
Figure 3:
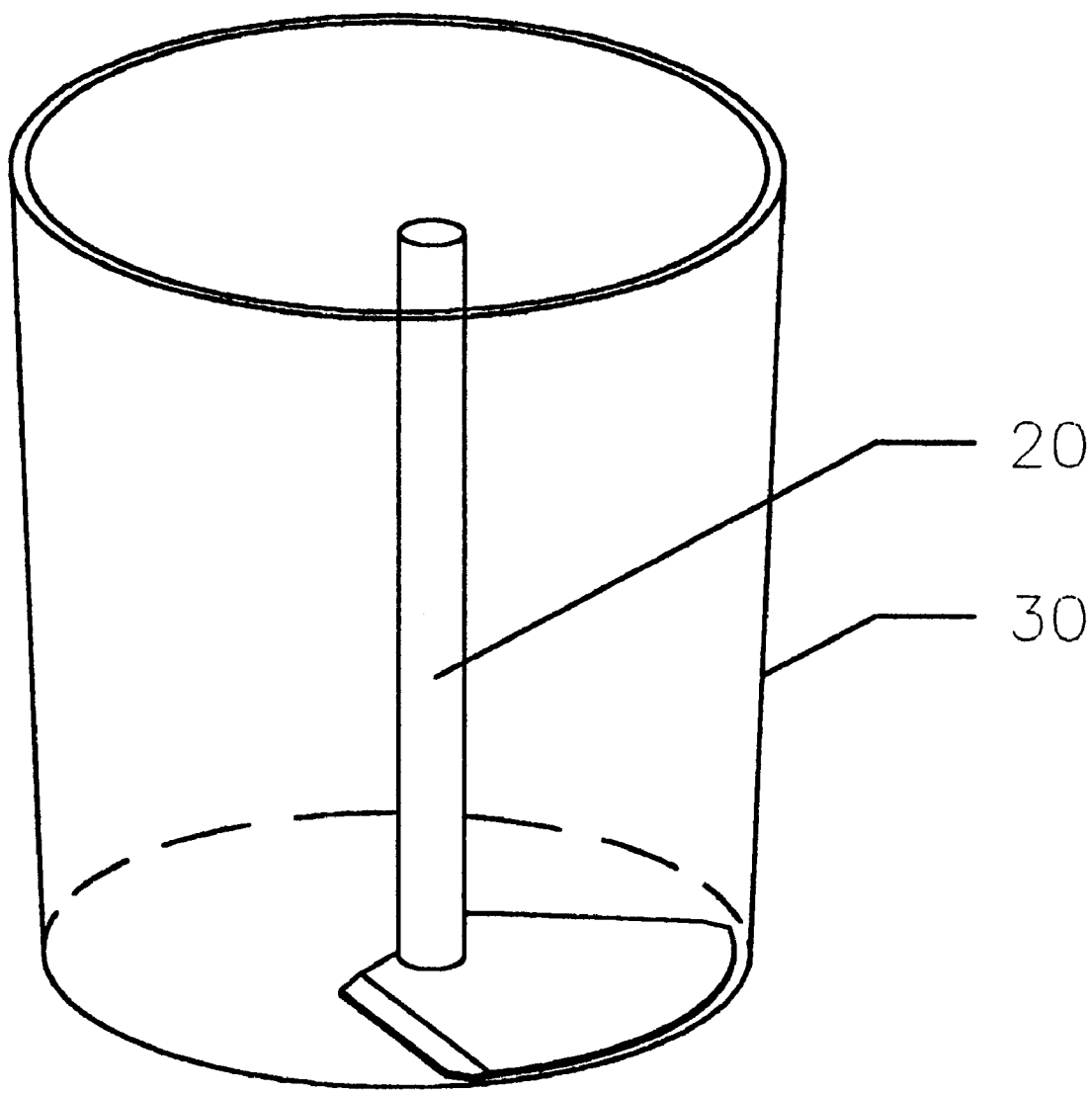
FIG. 3 is a side view showing an embodiment of the present invention conforming to the lower inside radial surface of a cylindrical container.
Figure 3A:
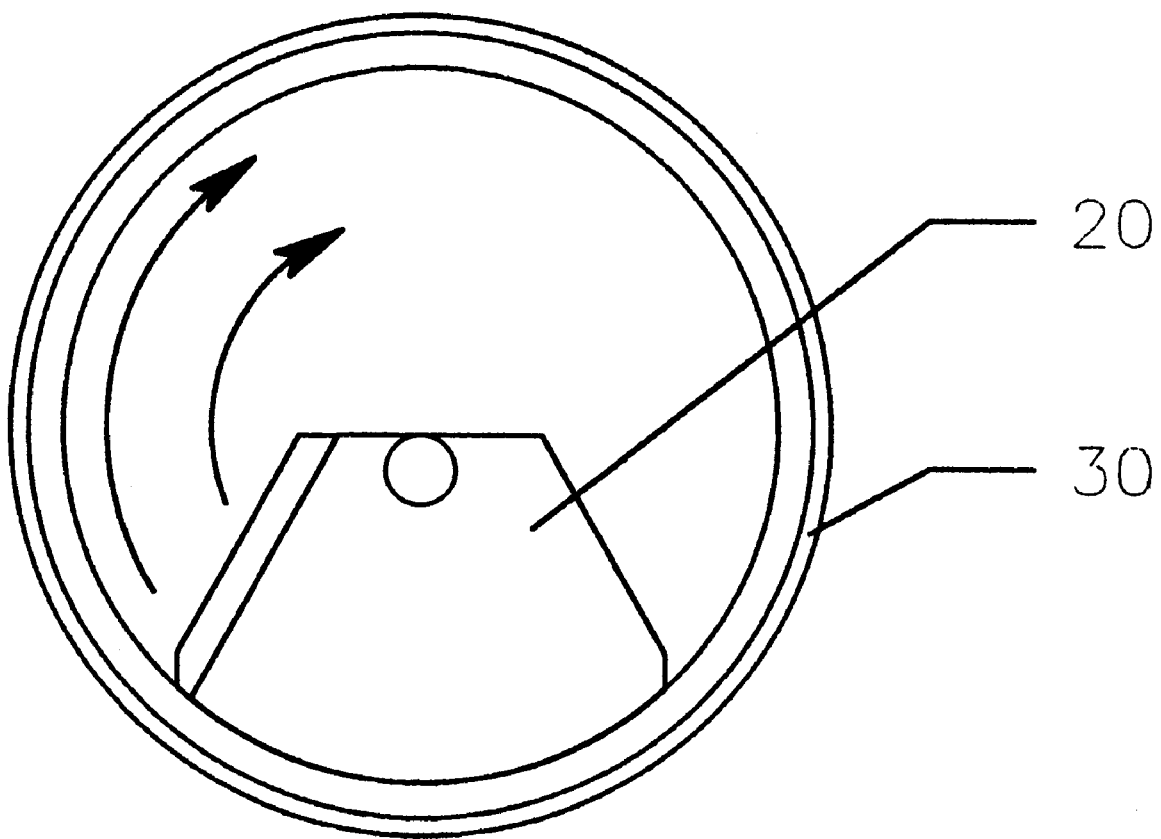
FIG. 3A is a top view showing an embodiment of the present invention conforming to both the bottom surface and the lower inside radial surface of a cylindrical container.

The contoured scoop and scraper tool 20 may be used to cleanly and efficiently scoop out materials, such as joint compound, from a cylindrical container (e.g., a bucket). The tool 20 allows the worker to obtain all of the joint compound from the bucket with a minimum of effort and mess. The tool 20 includes an elongated handle 22 having a contoured end plate 21 coupled to one end of the elongated handle. The handle may be cylindrical and hollow (i.e., tubular), cylindrical and filled, substantially flat, or any other shape providing the benefits of a sturdy handle. In various embodiments, handle 22 and end plate 21 are individual components and handle 22 is attached to end plate 21 by welding, gluing, riveting, or other suitable coupling methods known to those skilled in the art. Alternatively, handle 22 and end plate 21 may be integral. The handle and end plate may be formed of any suitable materials, such as plastic, wood, or metal, and any combination thereof End plate 21 is a substantially planar component formed generally in a pie shape with the point of the pie shape being truncated. The end plate has a substantially straight upper edge 23 at a line where the pie shape has been truncated. The end plate has two opposing side edges 24 and 25 extending symmetrically from first and second ends, respectively of upper edge 23 at an angle of approximately 60 degrees. Lower edge 28 of end plate 21 is configured to as an arc to conform to the radius of the inside bottom wall of a cylindrical container 30 (such as a bucket), as illustrated in FIGS. 3 and 3A. Two opposing ends 26 and 27 of lower edge 28 found at the junctures of lower edge 28 and side edges 24 and 25, respectively, are trimmed perpendicular to upper edge 23, in essence removing the two outer protruding corners of the end plate adjacent to the arc of lower edge 28. The size of end plate 21 from upper edge 23 to lower edge 28 is approximately equal to the radius of the cylindrical container 30, depending on how much of the point of the pie shape has been truncated. The end plate 21 may be constructed in different sizes to fit different sized cylindrical containers. Side edge 25 is projected downwardly along a line 29 parallel to edge 25, at an angle of approximately 10 degrees from the plane of end plate 21, (as best illustrated in FIG. 2) to provide a scraping surface.

Modifications to the shape of the tool and the materials used for handle and end plate of the present invention are anticipated and included within the scope of the present invention.

The manner of using the tool 20 first involves the worker grasping the elongated handle 22, and with a downward motion, lowering the tool into the container 30, thereby filling the tool with product (e.g., joint compound). With an upward motion, the worker then removes product from the container, allowing lower edge 28 to follow the contoured inside edge of the container. The product is then dispensed according to its application. As the worker empties the container, the tool 20 can be periodically used to wipe the sides of the container clean by allowing the lower edge 28 of the tool to follow the contoured inside edge of the container in a downward motion around the entire inside perimeter of the container.

Figure 4:
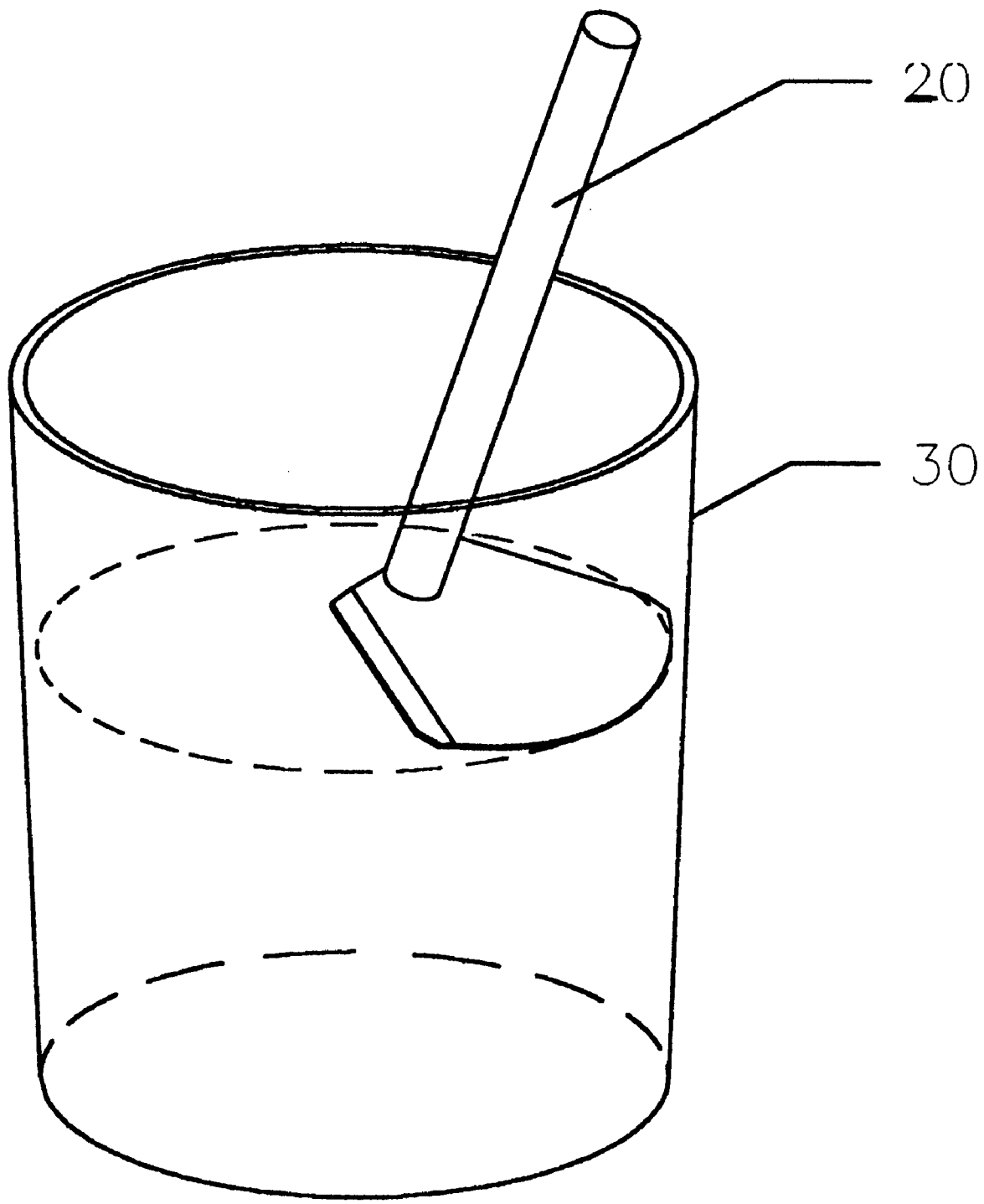
FIG. 4 is a side view showing an embodiment of the present invention conforming to the upper inside radial surface of a cylindrical container.
Figure 4A:
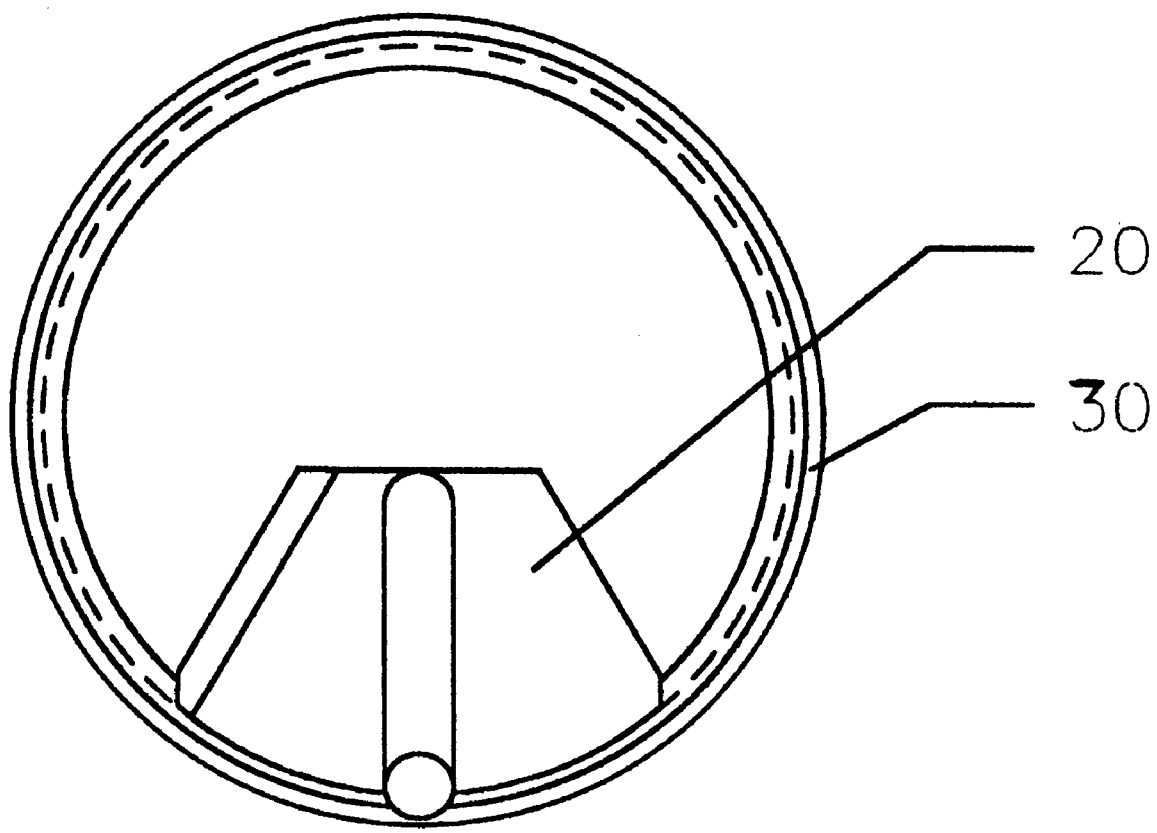
FIG. 4A is a top view showing an embodiment of the present invention conforming to the upper inside radial surface of a cylindrical container.

Some containers may be of a tapered type, and the tool 20 is then tilted towards the worker while raising or lowering the tool to conform it to the changing radius of the tapered container, as shown best in FIGS. 4 and 4A.

As the container becomes emptied the tool can also be used to clean the bottom of the container of remaining product. This is achieved by placing the tool in the bottom of the container and rotating the tool in a clockwise manner, as best shown in FIG. 3A. The projected side edge 25 serves as a blade to effectively remove product from the bottom of the container.

If a partially used container of product is to be stored, the tool can be used to thoroughly scrape the interior sides of the container in preparation for storage. This is achieved by allowing lower edge 28 of tool 20 to follow the contoured edge of the container in a downward motion. This procedure is repeated around the entire inside perimeter of the container until the sides are cleaned to the worker's satisfaction.

The handle 22 of the tool can be made at a length that would allow it to be stored inside the container 30, if desired.

It will be clear to one skilled in the art that tool 20 is capable of many applications and uses with assorted products, such as joint compounds, adhesives, and food service products.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended Claims.

What is claimed is:

1. A tool for obtaining materials out of a cylindrical container by scooping and scraping, the tool comprising:

an elongated handle;

a plate having the shape of a cone in two dimensions, the plate being coupled to one end of the elongated handle and extending substantially perpendicularly to a longitudinal axis of the elongated handle, the plate having a first edge projecting downwardly at an angle from the plate for use as a scraping edge, the plate being a truncated to form a second edge such that the plate has opposing first and third edges, the first and third edges extending from the second edge at an angle of approximately 60 degrees, the plate including a fourth edge adjacent to the first and third edges, the fourth edge forming an arc substantially conforming to an inside radial surface of the cylindrical container, wherein the plate further comprises a fifth edge perpendicular to the second edge, wherein the fifth edge is located at a juncture of the first and fourth edges.

2. A tool for obtaining materials out of a cylindrical container by scooping and scraping, the tool comprising:

an elongated handle;

a plate having the shape of a cone in two dimensions, the plate being coupled to one end of the elongated handle and extending substantially perpendicularly to a longitudinal axis of the elongated handle, the plate having a first edge projecting downwardly at an angle from the plate for use as a scraping edge, the plate being truncated to form a second edge such that the plate has opposing first and third edges, the first and third edges extending from the second edge at an angle of approximately 60 degrees, the plate including a fourth edge adjacent to the first and third edges, the fourth edge forming an arc substantially conforming to an inside radial surface of the cylindrical container, wherein the plate further comprises a sixth edge perpendicular to the second edge, wherein the sixth edge is located at a juncture of the third and fourth edges.

\* \* \* \* \*